May 30, 1944.    R. B. DAY ET AL    2,349,812
CATALYTIC REFORMING
Filed April 14, 1941
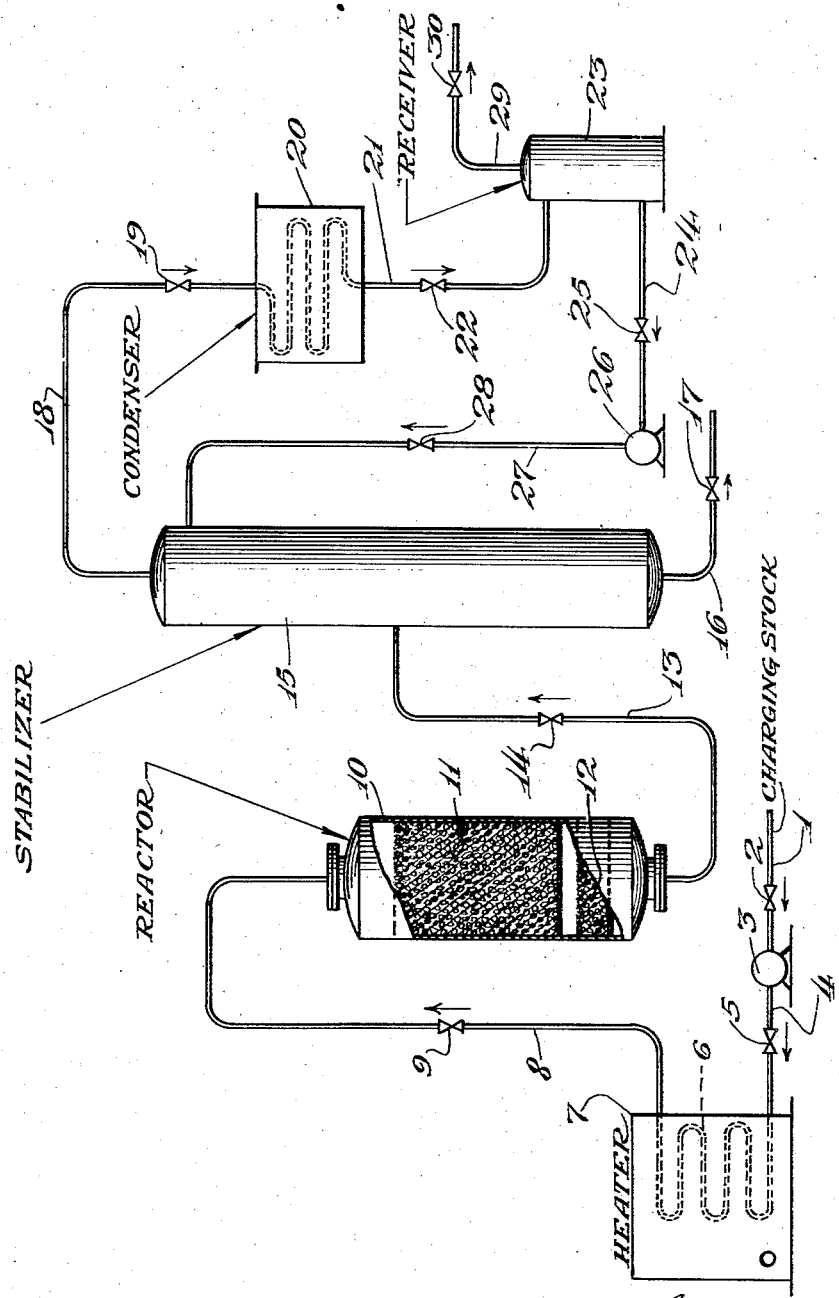
Inventors:
Roland B. Day
Elmer R. Kanhofer
By Lee J. Gary
Attorney Patented May 30, 1944

2,349,812

UNITED STATES PATENT OFFICE 2,349,812

CATALYTIC REFORMING

Roland B. Day and Elmer R. Kanhofer, Chicago, Ill., assignors to Universal Oil Products Company, Chicago, Ill., a corporation of Delaware Application April 14, 1941, Serial No. 388,464

1 Claim. (Cl. 196—50)

This invention relates to a process for the improvement of the octane number of straight run naphthas or other gasoline fractions having relatively low bromine number. By this process the naphtha charging stock is subjected to the action of two types of catalysts in a series operation. The primary function of the catalyst in the first step is to dehydrogenate the charging stock converting the naphthenes to aromatics and a considerable portion of the paraffins to olefinic hydrocarbons.

The catalysts used in the first step of our invention comprise some of the known dehydrogenating catalysts which have a selectivity in promoting the formation of olefins and which are not particularly effective in the cyclization reaction. A particularly effective catalyst for this purpose is magnesite or a mixture of zinc oxide and chromic oxide or lead chromate with or without zinc oxide.

A catalyst suitable for the second step includes the well known cracking catalysts of the silica alumina type, particularly those prepared by chemically precipitating and purifying the hydrogels of these oxides. These silica alumina catalysts may be promoted by such substances as hydrated thoria or hydrated zirconia. These cracking catalysts may be prepared in a number of ways. According to one method the silica is precipitated from the solution as a gel and after washing to remove sodium ions, is composited with a separately precipitated hydrated alumina. If desired, the alumina and silica may be simultaneously precipitated in the same solution by an adjustment of the hydrogen ion concentration. The composite cracking catalyst may also be prepared by impregnating silica with aqueous solution of an activating substance such as aluminum nitrate, zinc nitrate, thorium nitrate, or other soluble salts of these metals. The composite of hydrogels prepared according to the methods described is preferably free from alkali metal ions and is dried at a temperature of the order of 300° F. After drying at this temperature, the material may be formed into particles of suitable size such as by extrusion or pilling. In some cases it may be desired for purposes of economy to utilize natural occurring siliceous bases such as kaolin together with a minor amount of the chemically prepared and purified hydrogel. For example, a satisfactory catalyst for the olefin isomerizing step may be prepared by impregnating kaolin with aluminum nitrate solution followed by calcining the dried material. Satisfactory results may also be obtained by thoroughly incorporating a powdered kaolin with hydrated alumina.

The second step of our process has been termed an olefin isomerizing step but undoubtedly there are other reactions which contribute to the octane number of the olefin containing gasoline fraction. Thus in addition to the shifting of the double bond and the migration of alkyl groups, other reactions such as the formation of aromatics may take place to a minor extent. We shall not attempt a complete explanation of the beneficial effects of treatment of the olefinic gasoline by catalysts of the olefin isomerizing type such as those prepared by calcining the purified hydrous oxides such as hydrates of silica, alumina, zirconia, and thoria. Oxides of elements which readily undergo change in valence under the reduction conditions of the process or the oxidation conditions of the catalysts regeneration cycle, such as those of vanadium, tungsten, uranium, iron, nickel, and cobalt are not desirable in the second stage of our process.

The process of our invention may be conveniently described by reference to the accompanying drawing which diagrammatically illustrates one form of apparatus suitable for conducting the process of this invention.

The charging stock for the process comprising naphtha or gasoline fraction having a low bromine number is supplied to the system through line 1 and after passing through valve 2 is directed to pump 3 which discharges through line 4, valve 5, to heating coil 6. The charge is heated in coil 6 by means of furnace 7 to a temperature which may vary within the approximate limits of 850 to 1100° F. while being maintained under a pressure which may vary from atmospheric or slightly superatmospheric to about 50 or 100 pounds per square inch. The heated charging stock from which vapors form, is then supplied from coil 6 to line 8, controlled by valve 9 from which it is directed to reactor 10. As shown in the drawing, both the dehydrogenating and isomerizing catalyst may be contained within the same reactor. Adiabatic reactors may be used as these have the advantage of simplicity of construction although the use of heat exchange type of reactor is comprised within the scope of our invention. As the reaction in the dehydrogenation stage is highly endothermic, the use of such heat carrying media as steam or normally gaseous hydrocarbons may, in some cases, be desirable. The use of hydrogen to reduce the carbon formation during the dehydrogenation step is also comprised within the scope of our invention. This hydrogen may be conveniently supplied in a mixture with small quantities of normally gaseous products formed in the side reactions of the process. These heat carrying media or the hydrogen containing gases do no particular harm in the olefin isomerizing step although they are not needed in that stage of the process. As shown in the drawing, the depth of the bed of the dehydrogenating catalyst 11, is much greater than that of the olefin isomerizing catalyst 12, the space velocity through the second bed being 15 to 20 times that of the first. The space velocity of the olefin isomerizing step may be one corresponding to 5 to 25 volumes of liquid charging stock per hour per unit volume of catalyst at a temperature of 950° F.

The reaction products leaving reactor 10 enter line 13 and after passing through valve 14, are supplied to stabilizer column 15. The reaction products before entering stabilizer 15 are quenched with a hydrocarbon oil which conveniently may be an accumulation of the high boiling products formed in the process. The methods for conducting this quenching are well known in the art and for the sake of simplicity, have been omitted from the drawing. The stabilizer column operates in the conventional manner, the stabilizer gases being separated from the bottoms which are removed by way of line 16, valve 17. The overhead from the column consists of hydrogen and light hydrocarbon gases and is directed by way of line 18 through valve 19 to cooler and condenser 20. The mixture of liquid together with undissolved and uncondensed gases leave condenser 20 by way of line 21 after passing through valve 22, enter receiver and separator 23. The liquid cooled in receiver 23 is returned to the stabilizer for cooling and refluxing, being directed through line 24, valve 25 to pump 26 which discharges through line 27, valve 28 to the top of the stabilizing column. The gases collected in receiver 23 are removed by way of line 29, valve 30. As hereinbefore set forth, a portion of these hydrogen containing gases may be commingled with the charging stock before the latter is supplied to the reactor.

The following examples illustrate the results obtainable when utilizing the process of my invention. A charging stock comprising a 200 to 400° boiling range naphtha of 54.5° A. P. I. gravity and 42 octane number was heated to a temperature of 1002° F. and supplied to a bed of magnesite catalyst using a space velocity of 0.507 liquid volume charge per hour per unit volume of catalyst. The reactants from this catalyst were then passed through the second bed of catalyst comprising a blend of silica, alumina, zirconia in the ratio of 100 mols of $SiO_2$ to $4Al_2O_3$ to $2ZrO_2$ at a space velocity of 9.46 volumes of liquid per hour per unit volume of catalyst. Employing an adiabatic reactor, the temperature at the exit of the reactor was 980° F. Operating on the above conditions, a 92.8% yield of reformed gasoline having an octane number of 58.1 by the C. F. R. motor method, was obtained. The addition of 1½ cc. to tetraethyl lead increased this octane number to 69.9.

We claim as our invention:

A process for improving a gasoline fraction of relatively low antiknock value which comprises introducing the gasoline fraction to a reaction chamber containing a first bed of paraffin dehydrogenating catalyst and a second bed of olefin isomerizing catalyst, maintaining the reaction chamber under paraffin dehydrogenating and olefin isomerizing conditions of temperature and pressure, passing the gasoline fraction through said first bed at a space velocity sufficient to effect substantial dehydrogenation therein, then passing the gasoline fraction through said second bed at a space velocity such as to isomerize olefins formed by the dehydrogenation, said second bed being of substantially lesser depth than said first bed whereby to provide a higher space velocity in the second bed than in the first bed, and recovering the thus treated fraction.

ROLAND B. DAY.
ELMER R. KANHOFER.